United States Patent
Wittur

[11] Patent Number: 5,435,209
[45] Date of Patent: Jul. 25, 1995

[54] DRIVE UNIT FOR A HOISTING APPARATUS, IN PARTICULAR FOR A PASSENGER OR FREIGHT ELEVATOR

[75] Inventor: Horst Wittur, Karlsfeld, Germany

[73] Assignee: Wittur Aufzugteile GmbH & Co., Wiedenzhausen, Germany

[21] Appl. No.: 80,190

[22] Filed: Jun. 23, 1993

[30] Foreign Application Priority Data

Jun. 26, 1992 [DE] Germany .......... 42 21 005.4
Jun. 30, 1992 [DE] Germany .......... 42 21 399.1

[51] Int. Cl.⁶ .................................. F16H 57/02
[52] U.S. Cl. ................. 74/606 R; 188/170; 475/331
[58] Field of Search ......... 74/606 R; 475/331; 188/72.4, 170

[56] References Cited

U.S. PATENT DOCUMENTS

| | | | |
|---|---|---|---|
| 772,005 | 10/1904 | Sondh et al. | 74/606 |
| 2,085,040 | 6/1937 | Post | 188/170 |
| 3,184,006 | 5/1965 | Fox | 188/170 |
| 3,604,684 | 9/1971 | Eithun | 188/170 |
| 4,238,967 | 12/1980 | Volkov et al. | 475/331 |
| 5,010,981 | 4/1991 | Heikkinen | |

FOREIGN PATENT DOCUMENTS 0293409  8/1991  Germany .......... 475/331
WO89/11436 11/1989 WIPO .

OTHER PUBLICATIONS

The Rope Gripper (Advertisement of Hollister-Whitney -publication date unknown).

*Primary Examiner*—Edward K. Look
*Assistant Examiner*—Mark Sgantzos
*Attorney, Agent, or Firm*—Keck, Mahin & Cate

[57] ABSTRACT

A drive unit for a hoisting apparatus and, in particular, a passenger or freight elevator, has a supporting structure, a drive motor, a brake apparatus and a planet gear. The planet gear is driven by the drive motor and has a housing jacket which forms the drive stage and bears a pulley on its periphery. The planet gear is supported by the supporting structure on both sides of the pulley. As opposed to a one-sided support, this results in a favorable load distribution. The brake apparatus is provided on the driven portion of the planet gear.

18 Claims, 4 Drawing Sheets

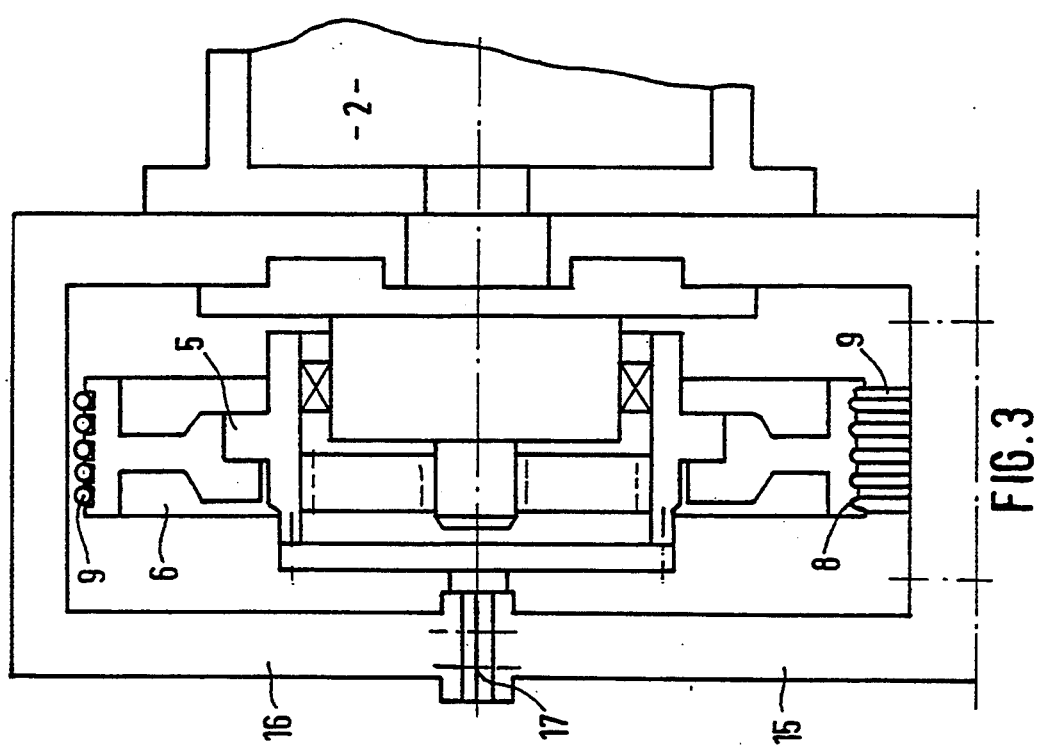
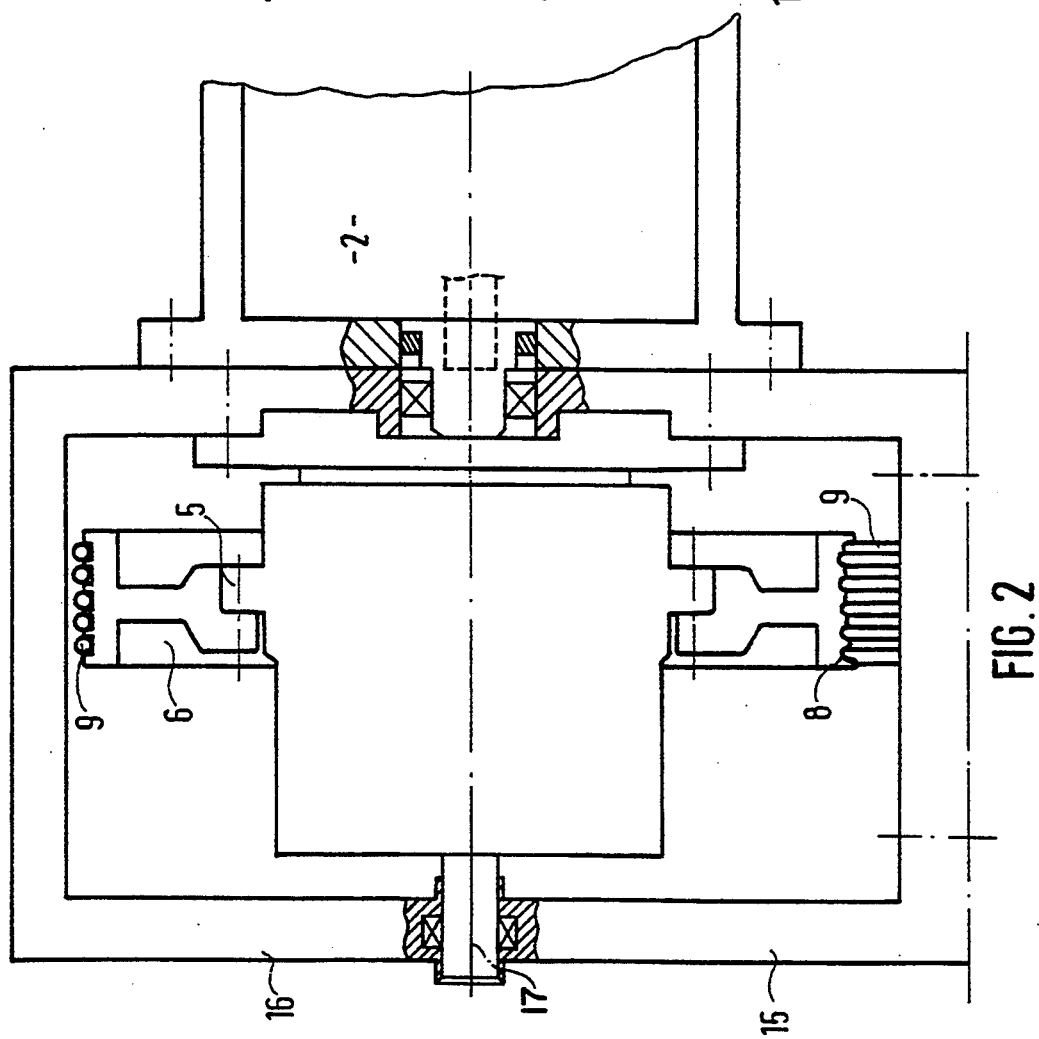

1

DRIVE UNIT FOR A HOISTING APPARATUS, IN PARTICULAR FOR A PASSENGER OR FREIGHT ELEVATOR

BACKGROUND OF THE INVENTION

1. Field of the Invention

The present invention relates to a drive unit for a hoisting apparatus according to the preamble of claim 1.

Spur gears, in particular planet gears, have recently been favored in such drive units over the worm gears formerly used almost exclusively, because they are more efficient and permit better performance, especially when starting up and slowing down.

2. Description of Related Art

A generic drive unit, known from WO 89/11436 A1, is of tripartite construction with a motor, a brake and a planet gear. The brake housing forms the supporting structure on which the motor and the planet gear are each flange-mounted. Due to the drive line with the series-connected components extending continuously in the axial direction, this unit has a comparatively great overall length which is sometimes excessive for the dimensions of an elevator shaft. Due to the unsupported planet gear flange-mounted on the brake housing and the loads of the cage and counterweight applied, a considerable pitching moment must also be taken up by the brake housing. Consequently, special measures must be taken with respect to the anchoring in the substructure of the building. Since the brake is positioned on the motor side, the toothing of the gearing is exposed to instantaneous loads, particularly during loading and unloading of the cage, so that premature wear must be expected.

SUMMARY OF THE INVENTION

The invention is based on the problem of providing a drive unit which permits a shortening of the overall length, ensures that loads are passed uniformly into the building and relieves the toothing of the gearing when at a standstill, thereby reducing the total technical effort required for the total system and increasing its life.

This problem is solved in accordance with a construction in which the planet gear is supported on the supporting structure on both sides of the pulley and the driven portion of the planet gear is formed, directly or indirectly, as a braked portion of the brake apparatus.

This permits loads to be taken up and removed uniformly into the building. The drive motor is mounted on the supporting structure opposite the planet gear so that the omission of the brake housing substantially shortens the overall length.

The brake can act in suitable fashion on the gearing or the pulley.

The additional support of the gearing on the housing jacket makes it possible to shorten the overall length of the gearing since on of the weight-carrying bearings can be omitted.

The supporting structure can be formed as a U-shaped frame or as a divided housing which at least partly encloses the planet gear. This makes it easier to provide various braking systems.

BRIEF DESCRIPTION OF THE DRAWINGS

Further features, advantages and details of the invention will be clear from the following description of preferred embodiments, and by reference to the drawings, in which:

FIG. 2 shows a side view of a drive unit with a supporting frame formed as a divided housing;

FIG. 3 shows a partly sectional view with a shortened gearing;

DESCRIPTION OF THE PREFERRED EMBODIMENTS

Figure 1:
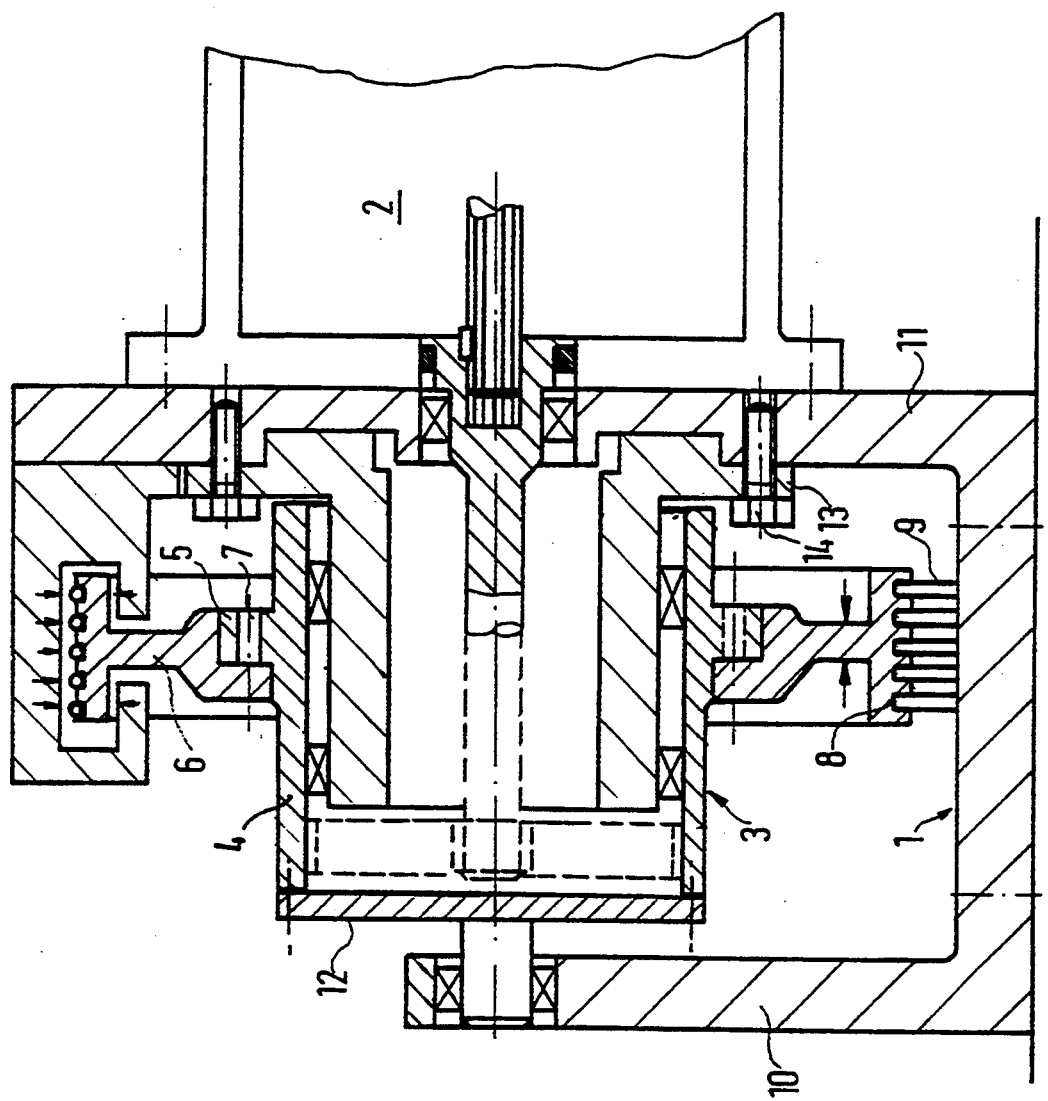
FIG. 1 shows a longitudinal section through an inventive drive unit with a U-shaped supporting frame.
Figure 5:
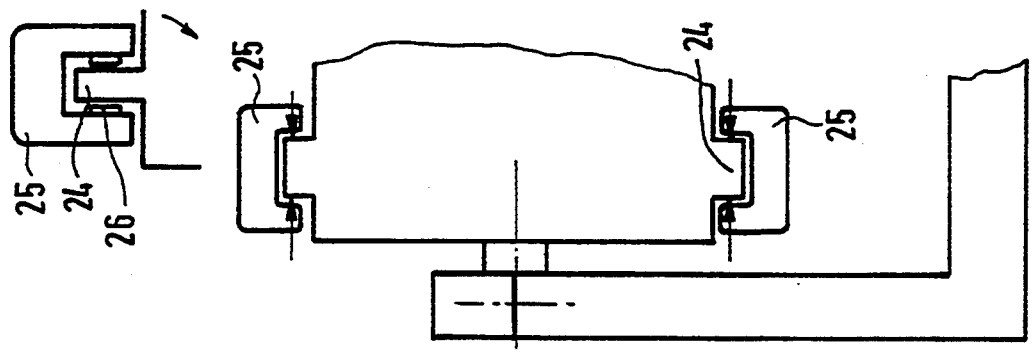
FIG. 5 shows a disk brake means acting on the housing jacket.

FIGS. 1 to 3 show, schematically, a drive unit suitable for a passenger elevator. The essential components of the unit are supporting structure 1, drive motor 2 and planet gear 3. Supporting structure 1 is fixed, in a way not shown, on carriers or a foundation within or over the elevator shaft in order to take up the static and dynamic forces produced by the cage and counterweight and remove them into the building. The principle and mode of operation of the planet gear are not the object of the invention and are therefore not explained in any detail.

The drive side of planet gear 3 is formed by housing jacket 4. The housing jacket bears flange 5 with which pulley 6 is connected by screws 7. Pulley 6 is provided on its outer periphery with grooves 8 in which ropes 9 of the elevator are placed.

In the embodiment according to FIG. 1, supporting structure 1 comprises a U-shaped frame with legs 10 and 11. End face 12 of housing jacket 4 is rotatably mounted between legs 10 and 11 and supported by leg 10. The stationary gearing portion, flange 13, is mounted with screws 14 on leg 11. Drive motor 2 is flange-mounted on the outside of leg 11 coaxially with the planet gear and connected therewith via a suitable shaft coupling.

According to FIGS. 2 and 3, the supporting frame is formed by two housing portions 15 and 16 which meet at horizontal parting line 17. The sides parallel with the plane of projection are open for ventilation, but in case of need they can also be of closed design. Openings are provided for the ropes to pass through. Unlike the designs in FIGS. 1 and 2 the gearing of FIG. 3 has only one internal weight-carrying bearing. This is possible due to the arrangement of the outside bearing in the supporting structure and results in a shortening of the overall length of the planet gear.

The inventive formation of the supporting frame permits the mounting of upper yoke-shaped housing portion 16, thereby making it easier to provide various brake apparatus in various positions.

FIGS. 4 to 10 show preferred embodiments of brake apparatus.

Figure 4:
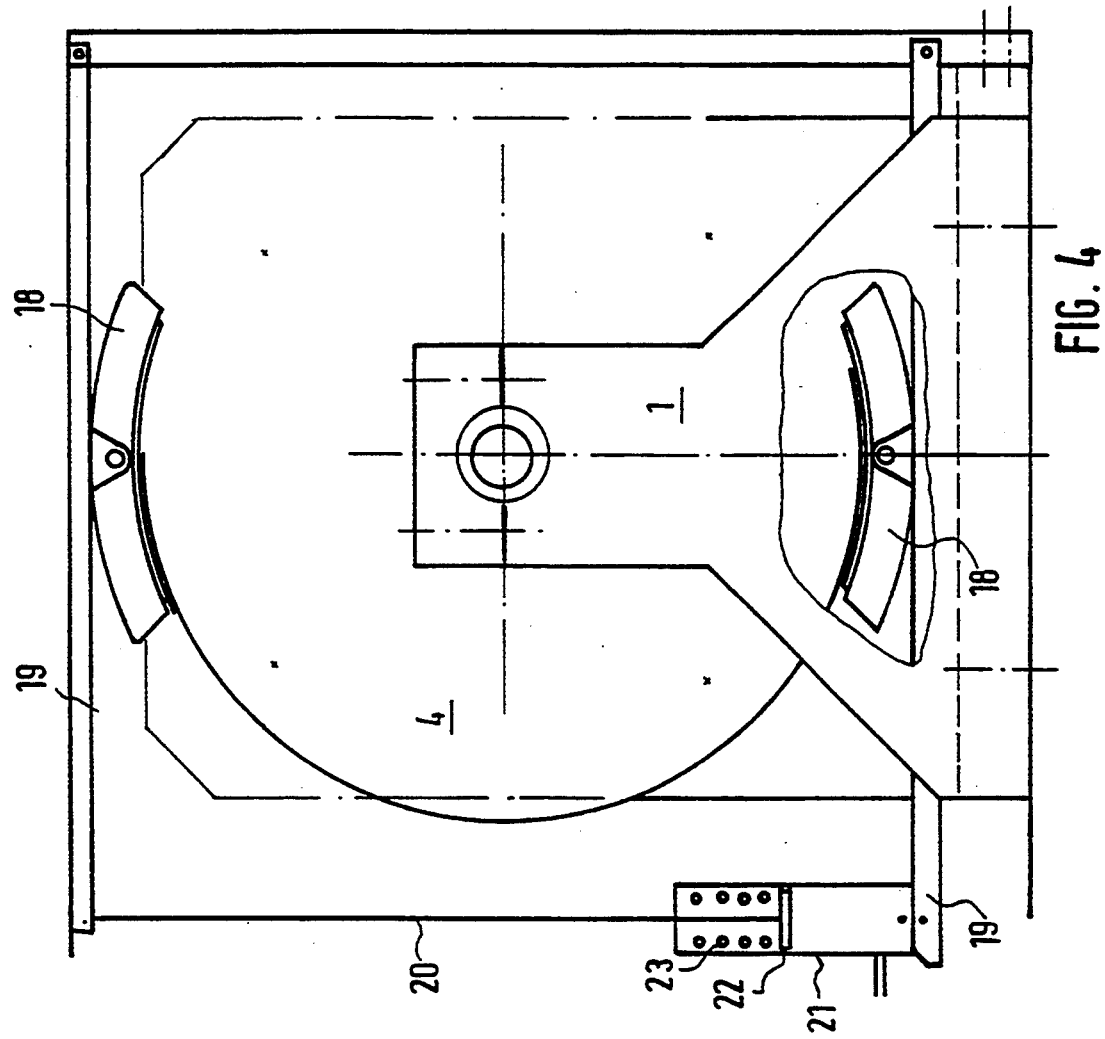
FIG. 4 shows a view of the support means on the end face of the housing jacket.

According to FIG. 4, housing jacket 4 is formed as an outside brake drum acted upon by two diametrically opposed brake shoes 18. Brake shoes 18 are mounted on carriers 19 which are fixed at one end on the supporting structure and interconnected at the other ends via rod assembly 20 and via piston-cylinder assembly 21. Compression spring 23 acts on piston 22 within the cylinder, thereby urging brake shoes 18 against housing jacket 4. The brake shoes can be offset both axially and radially.

In addition to its function as the drive side portion of the planet gear and carrier of the pulley, housing jacket 4 forms the braked portion of the brake apparatus. For this purpose brake disk 24 is mounted or formed on the housing jacket in the embodiment according to FIG. 5, with two calipers 25 straddling said brake disk at two diametrically opposed places. Two brake blocks 26 are mounted in each caliper 25 and come to lie against both sides of the brake disk under spring force and are released therefrom under the action of a hydraulic, electric or mechanical counterforce when the drive is running. Calipers 25 are suitably mounted in stationary fashion, e.g. on supporting structure 1.

Figure 6:
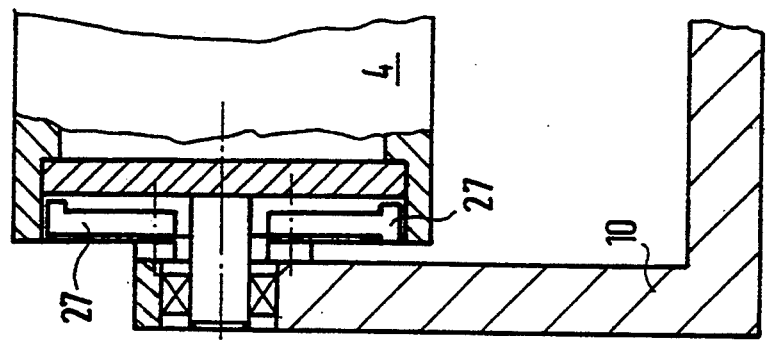
FIG. 6 shows a drum brake acting on the housing jacket.

In the embodiment of FIG. 6, the housing jacket is formed on its end face as the drum of an inside drum brake. The brake shoes are designated as 27.

Figure 7:
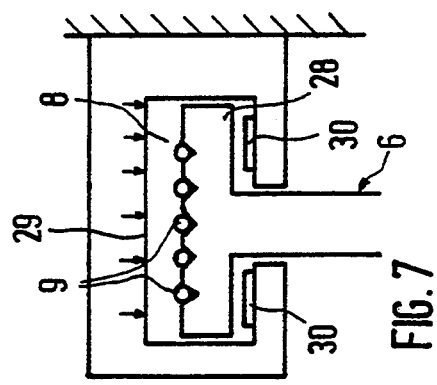
FIG. 7 shows a brake apparatus acting on the outer periphery of the pulley.

In the example in FIG. 7, the brake acts directly on pulley 6 or ropes 9. The pulley is provided on its entire outer periphery with a pulley flange 28 having grooves 8 for taking up ropes 9 worked thereinto. The brake apparatus embraces the flange from above and below like a pair of tongs in the upper area of the pulley where the ropes lie in the grooves. Upon braking, upper braking area 29 comes to lie against the top surface of ropes 9 while lower brake blocks 30 come to lie against flange 28 from below. The radial forces exerted by the brake are thus compensated so that the only remaining braking force is that acting in the circumferential direction, which is taken up by the supporting structure.

Figure 8:
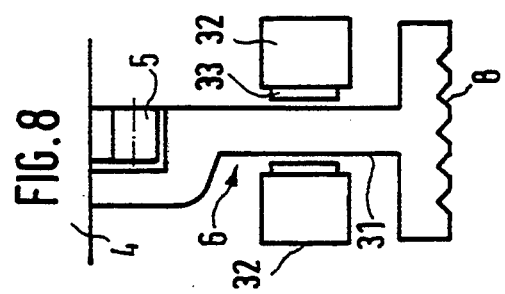
FIG. 8 shows a brake means formed as a disk brake whereby the web of the pulley serves as a brake disk.

In the example of FIG. 8, web 31 of pulley 6 is simultaneously formed as a brake disk. Local retainer means 32 are provided instead of a caliper for brake blocks 33.

Figure 9:
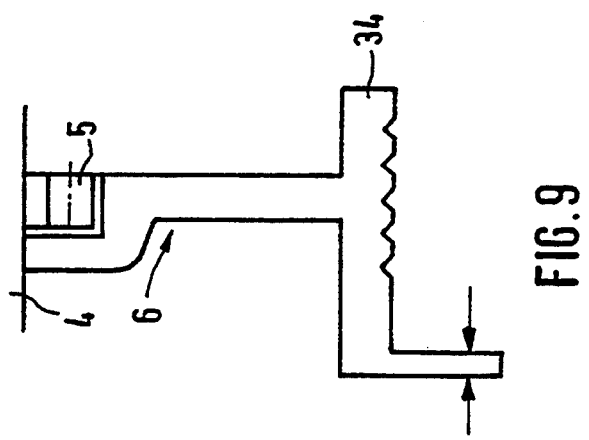
FIG. 9 shows a brake means formed as a disk brake whereby the pulley flange acts as a brake disk.

In the example of FIG. 9, flange 34 of drive pulley 6 is formed as the brake disk.

I claim:

1. A drive unit for a hoisting apparatus comprising:
   a supporting structure transferring forces produced during hoisting to a building,
   a drive motor,
   a brake apparatus,
   a planet gear driven by the drive motor, said planet gear including a housing jacket forming a drive stage,
   a pulley borne on a periphery of said housing jacket, the planet gear being supported on the supporting structure at both sides of the pulley, the housing jacket of the planet gear forming a braked portion of the brake apparatus.

2. The drive unit of claim 1, and further comprising an end face closing off one end face of said housing jacket, wherein the planet gear is interconnected, on one side thereof, to said supporting structure by the end face and, on an opposite side thereof to the drive motor.

3. The drive unit of claim 2, characterized in that the housing jacket is supported on a periphery of a part of said supporting structure.

4. The drive unit of claim 2, characterized in that the pulley is supported on a periphery of said housing jacket by a flange.

5. The drive unit of claim 1, characterized in that the supporting structure is formed as a supporting frame within which the planet gear is supported on two opposite sides.

6. The drive unit of claim 5, characterized in that the supporting frame is of integral and substantially U-shaped design and has a pair of legs forming a "U", the legs of the "U" forming the two opposite sides of the supporting structure.

7. The drive unit of claim 5, characterized in that the supporting frame is formed by at least two housing portions divided along an axial plane of gearing of the planet gear and at least partly enclosing the planet gear.

8. The drive unit of claim 1, characterized in that the planet gear is supported, at its outer periphery, by the supporting structure on at least one side of the pulley.

9. The drive unit of claim 1, characterized in that the drive motor is mounted outside of the supporting structure.

10. The drive unit of claim 1, characterized in that the supporting structure forms a motor mount frame and the drive motor is interconnected by a drive shaft with the planet gear.

11. The drive unit of claim 1, characterized in that the pulley is disposed in the supporting structure substantially centrally of the supporting structure.

12. The drive unit of claim 1, characterized in that the brake apparatus is provided on at least one of the housing jacket of the planet gear and the pulley.

13. The drive unit of claim 12, characterized in that the brake apparatus has at least one brake disk provided on an outside of at least one of the housing jacket and the pulley.

14. The drive unit of claim 12, characterized in that the housing jacket has a braking area for at least one of a shoe brake and a band brake.

15. The drive unit of claim 14, characterized in that the pulley is provided with a circumferentially extending ring-shaped flange with grooves for taking up ropes worked into its outer periphery, the brake apparatus acting radially on both radially outwardly directed surfaces on the ropes and against an inside of the flange.

16. The drive unit of claim 12, and further comprising a web connecting said pulley to said housing jacket, characterized in that the brake apparatus includes a disk brake and the web of the pulley forms a braking area for the disk brake.

17. The drive unit of claim 12, characterized in that the brake apparatus includes a disk brake and a radially aligned part of the pulley is formed as a brake disk.

18. The drive unit of claim 15, characterized in that the flange forms a brake disk.

* * * * *